(12) United States Patent
Tsuboi et al.

(10) Patent No.: US 7,296,800 B2
(45) Date of Patent: Nov. 20, 2007

(54) SEAL DEVICE

(75) Inventors: Hajime Tsuboi, Tokyo (JP); Toshiya Fuke, Tokyo (JP); Norio Fukushima, Tokyo (JP)

(73) Assignees: Eagle Industry Co., Ltd., Tokyo (JP); Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 10/991,423

(22) Filed: Nov. 19, 2004

(65) Prior Publication Data

US 2005/0110219 A1 May 26, 2005

(30) Foreign Application Priority Data

Nov. 20, 2003 (JP) ............................... 2003-390580

(51) Int. Cl.
*F16J 15/34* (2006.01)
*F16J 15/38* (2006.01)
(52) U.S. Cl. ................ 277/358; 277/394; 277/397
(58) Field of Classification Search ............... 277/358, 277/370, 372, 390, 394, 397
See application file for complete search history.

(56) References Cited

U.S. PATENT DOCUMENTS

| | | | |
|---|---|---|---|
| 3,241,844 A * | 3/1966 | Morley | 277/370 |
| 4,256,315 A * | 3/1981 | Larson et al. | 277/381 |
| 5,195,755 A * | 3/1993 | Ootsuka et al. | 277/358 |
| 5,826,884 A | 10/1998 | Anderton et al. | |
| 6,086,069 A | 7/2000 | Bedford | |
| 6,494,459 B1 * | 12/2002 | Zutz | 277/390 |

FOREIGN PATENT DOCUMENTS

GB 2 337 798 A 12/1999

* cited by examiner

*Primary Examiner*—Patricia Engle
*Assistant Examiner*—Gilbert Lee
(74) *Attorney, Agent, or Firm*—Arent Fox LLP

(57) ABSTRACT

A seal device that includes a seal portion protruding from a resilient body member in a common direction with a seal lip member. The seal portion being shorter in length and having a thickness that is thinner than the lip seal member. A gap is defined between an action diameter surface of the seal lip member and one of either a retainer portion or a ring member, wherein the seal portion contacts the other one of the retainer portion or ring member. A pressure receiving groove is defined between the seal lip member and the seal portion, and is in communication with the gap.

2 Claims, 9 Drawing Sheets

SEAL DEVICE

BACKGROUND OF THE INVENTION

1. Field of the Invention

The present invention relates to a seal device disposed in crawler roller, reduction gear, hydraulic motor, track roller or the like. More particularly, the invention relates to a seal device for crawler roller, hydraulic motor or the like used in construction machinery, which provides an effective seal against a process.

2. Description of the Related Art

There is a seal device of a mechanical seal type as a prior art related to the present invention which is employed in a crawler unit. This seal device is installed between a casing and a rotary member in order to keep out slurry, dirt, water containing abrasive particles or the like from the relatively rotating interface therebetween. This, however, necessitates use of a resilient O-ring for providing a seal between a seal ring of the seal device and the casing which retains the seal ring in a mating manner. Abrasive particles entrapped between the seal ring and the casing are likely to cause rapid wear of the seal ring and the casing. Wear of an urging spring for the seal ring and immersion of the spring in the dirt due to the abrasive particles will lead to an insufficient urging force against the seal ring. To alleviate these problems, resilient rings are introduced to provide not only a resilient force to the seal ring but also a seal at the interface between the contact surfaces where the seal ring is retained.

Primary related art of the present invention is found as a floating seal disclosed in U.S. Pat. No. 6,086,069 issued to Bedford as shown in FIG. 9. This illustrates a cross sectional view of a floating seal 101 mounted in a crawler roller unit. In FIG. 9, a reference numeral 120 represents a shaft. The shaft 120 is disposed within a through bore of a roller 125, and a floating seal 101 is disposed in the gap formed between the shaft 120 and the roller 125. The floating seal 101 provides a seal by preventing dirt water or fine dirt particles from entering thereto.

In this floating seal 101, a first resilient ring 102 has an annularly shaped body whose cross section is "J"-shaped and outer surface forms a curved concave face 105. One end face of the primary resilient ring 102 is defined as outer fitting face 102A while the other end face is defined as inner fitting face 102B. Likewise, a second resilient ring 103 has also an annularly shaped body whose cross section is "J"-shaped and outer surface forms a curved concave face 105. Therefore one end face of the secondary resilient ring 103 defines outer fitting face 103A while the other end face defines inner fitting face 103B.

Next a first seal ring 110 has an annularly shaped body whose cross section is "U"-shaped and its radially extending end face of the first seal ring 110 defines a seal face 110A. An annular groove of the seal ring 110 which is located on the other side of the seal face 110A defines a mount groove portion 110B. Likewise, a second seal ring 111 has an annularly shaped body whose cross section is also "U"-shaped and its radially extending end face of the second seal ring 111 defines a mating seal face 111A. An annular groove disposed on the other side of the seal face 111A then defines a mount groove portion 111B.

The first resilient ring 102 and the second resilient ring 103 thus constructed as well as the first seal ring 110 and the second seal ring 111 are all installed within the chamber formed between the shaft 120 and the roller 125, as depicted in FIG. 8. Therefore the first resilient ring 102 and the second resilient ring 103 retain curved concave surfaces 105, 105 relative to an ambient passage chamber 126. Also the first resilient ring 102 and the second resilient ring 103 possess curved convex surfaces relative to a lubricant-filled internal chamber 127. The first resilient ring 102 exerts a resiliently urging force such that the seal surface 110A of the first seal ring 110 is pressed against the second seal ring 103. The opposed seal surfaces 110A and 111A being pressed against each other provide an effective seal for the process fluid coming into the ambient passage chamber 126.

When the first pressure receiving surface 105 of the first resilient seal ring 102 and the second pressure receiving surface 105 of the second resilient seal ring 103 are acted on by the sealed fluid from the ambient communication chamber 126 side, the first pressure receiving surface 105 of the first resilient seal ring 102 and the second pressure receiving surface 105 of the second resilient seal ring 103 which are bent to form concave surfaces are further bent toward the internal chamber 127 side due to the fluid pressure. This causes the contact forces at the first seal surface 110A and the second seal surface 110A to decrease. At the same time, this also induces elastic deformation of the first resilient ring 102 and the second resilient ring 103 in such a direction that the first inner circumferential mount portion 102B of the first resilient ring 102 and the second inner circumferential mount portion 103B of the second resilient ring 103 may depart from the first mount concave portion 110B and the second mount concave portion 111B, respectively. As a result, seal ability at the first mount concave portion 110B and the second mount concave portion 111B is weakened. Furthermore, sealed fluid or fine dirt particles entering from the ambient communication chamber 126 side into the interface gap formed between the first inner circumferential mount portion 102B and the first mount concave portion 110B and another gap between the second inner circumferential mount portion 103B and the second mount concave portion 111B will cause wear of the contact surfaces of the first inner circumferential mount portion 102B and the second inner circumferential mount portion 103B. This will lead to a deterioration of the seal performance in the floating seal 101.

In particular, the first seal ring 110 and the second seal ring 111 are resiliently urged against each other by the first resilient ring 102 and the second resilient ring 103, respectively. In this configuration, elastic deformation of the first resilient ring 102 and the second resilient ring 103 causes the contact force between the first seal surface 110A of the first seal ring 110 and the second seal surface 111A of the second seal ring 111 to decrease. Such elastic deformation also causes the first seal surface 110A and the second seal surface 111A being in contact to Moreover, there is another type of floating seal disclosed in U.S. Pat. No. 5,826,884 issued to Anderton. For the track seal assembly disclosed therein, a loading member corresponding to a resilient ring is arranged to urge a ceramic seal member against a seal surface, similarly to the descriptions in FIG. 9. Thus there remain similar problems encountered in FIG. 9.

The present invention is introduced to alleviate the above mentioned problems. A primary technical goal which this invention tries to achieve is to provide a seal ring with a desired urging force by means of a resilient seal ring and to exhibit seal capability of a seal surface by sealingly retaining the seal ring even under the influence of pressure of dirt water or the like. Another goal is to prevent dirt water or the like from leaking to the interface between the resilient seal ring and the support portion by sealingly retaining the seal ring with the resilient seal ring. Yet another goal is to prevent dirt water or the like from giving damage to the mount surfaces of the resilient seal ring.

BRIEF SUMMARY OF THE INVENTION

A primary object of the present invention is to alleviate the above mentioned technical disadvantages, and a solution to such disadvantages is embodied as follows.

A seal device related with the present invention is for effecting a seal between a shaft disposing a retainer portion and a ring member being inserted over the shaft and being rotatable relative to the shaft. The seal device comprises a second seal ring, a first seal ring, a first resilient body member and a first seal lip member, wherein the second seal ring has a second seal surface and is sealingly retained by packings, the packings being disposed at one member of either a retainer portion or a ring member, wherein the first seal ring is inserted over the shaft and has a first seal surface, a first support portion and a first outer diameter seal contact surface, the first seal surface facing oppositely against the second seal surface, the first support portion being disposed on the opposite side to the first seal surface, the first outer diameter seal contact surface being disposed on the outer circumferential surface between the first seal surface and the first support portion, wherein the first resilient body member is made of rubber-like elastic material and retains a first inner circumferential seal portion at its one end and a first outer circumferential seal portion at the other end and provides the first seal ring with an urging force, the first inner circumferential seal portion being engaged with the first support portion of the first seal ring, the first outer circumferential seal portion being engaged with the other member of either a retainer portion or a ring member, wherein the first seal lip member protrudes from the first resilient body member in an integral manner and is matingly brought into seal contact with the first outer diameter seal contact surface.

According to the seal device related to the present invention, since the first seal lip member and the second seal lip member are brought into seal contact with the outer diameter seal contact surfaces, the sealed fluid pressure exerted from the ambient communication chamber side acts on the action circumferential surfaces of the individual seal lip members. This intensifies the contact of the seal lip members against the outer diameter circumferential seal contact surfaces and effectively prevents the sealed fluid from leaking into the interfaces between the first support portion and the first inner circumferential seal portion and between the second support portion and the second inner circumferential seal portion. And elastic deformation of the resilient body members is able to maintain sufficient urging forces to keep seal contact between the mutually opposing seal surfaces. Further, the seal lip members which are in a seal contact relation with the corresponding outer diameter seal contact surfaces resist against the elastic deformation of the resilient body members. This in turn provides urging forces to the seal rings and effectively prevents a decrease in contact strength at the seal surfaces. The first seal surface of the first seal ring which is sealingly retained by the first seal lip member can be brought into secure seal contact with the second seal surface of the second seal ring for outstanding seal performance even against dirt water as sealed fluid.

DETAILED DESCRIPTION OF THE INVENTION

Described below is details of the figures of preferred embodiments of the present invention according to actual design drawings with accurate dimensional relations.

Figure 1:
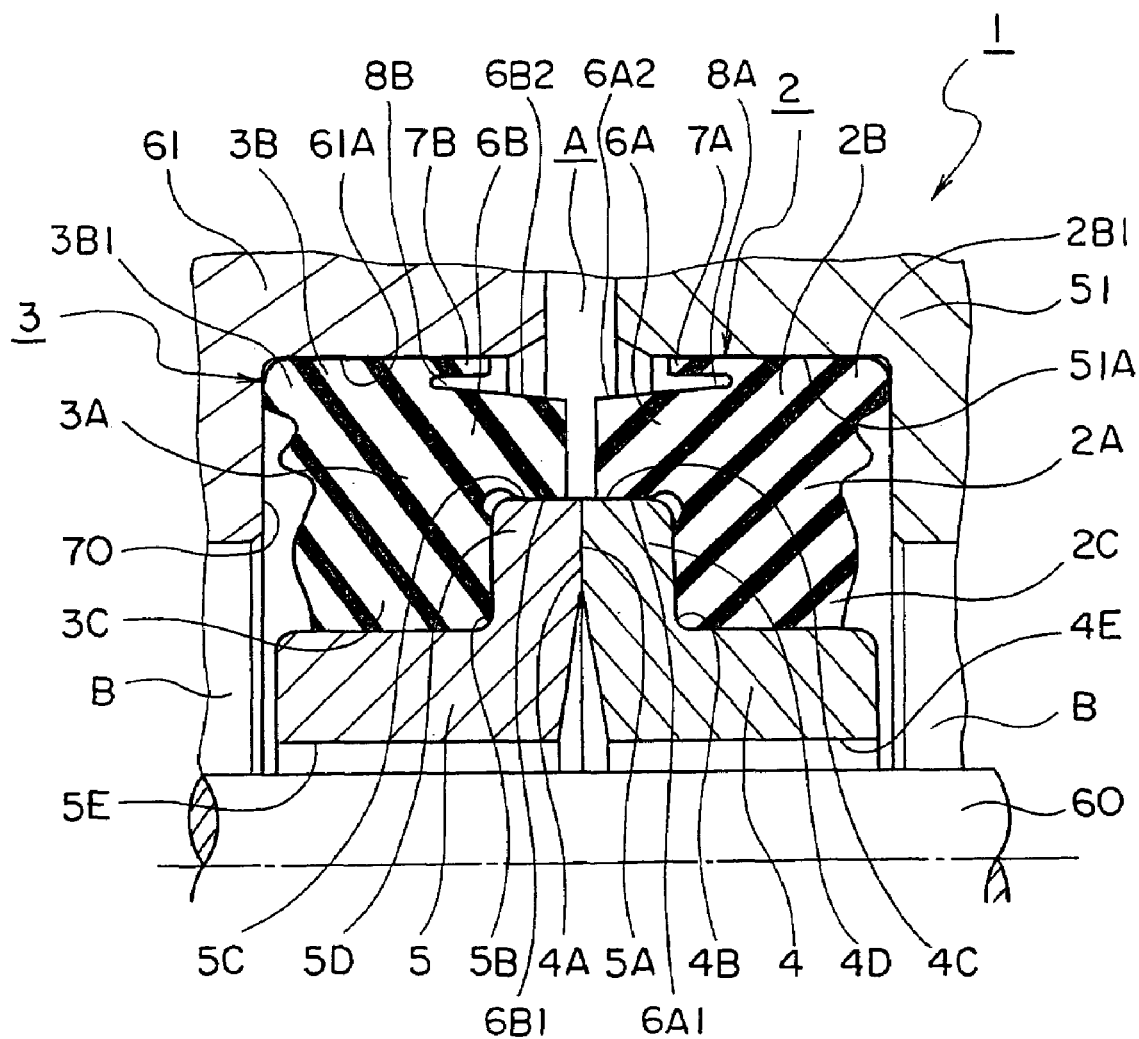
FIG. 1 is a half section view of a seal device illustrating a first embodiment related to the present invention.
Figure 2:
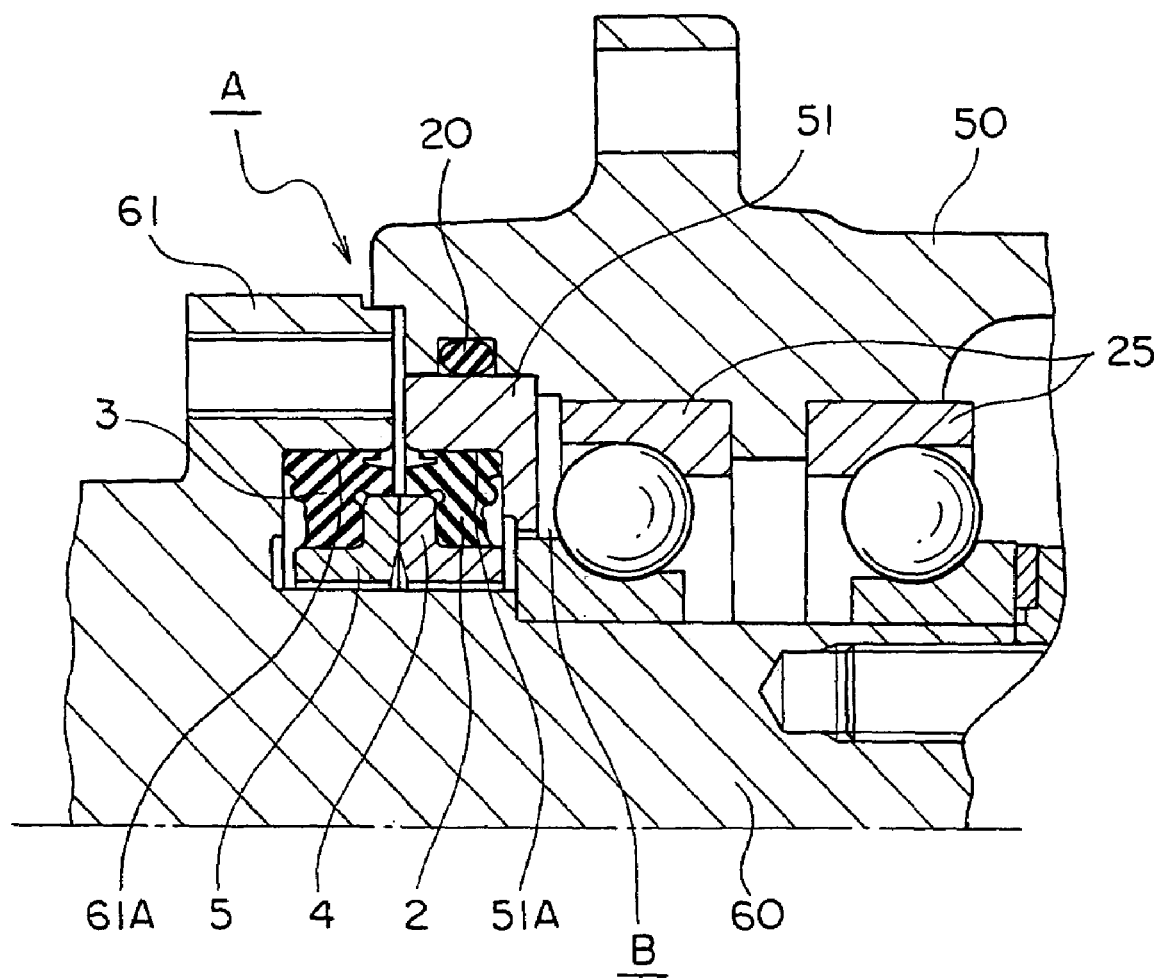
FIG. 2 is a partial section view of a reduction gear unit mounting the seal device shown in FIG. 1.
Figure 3:
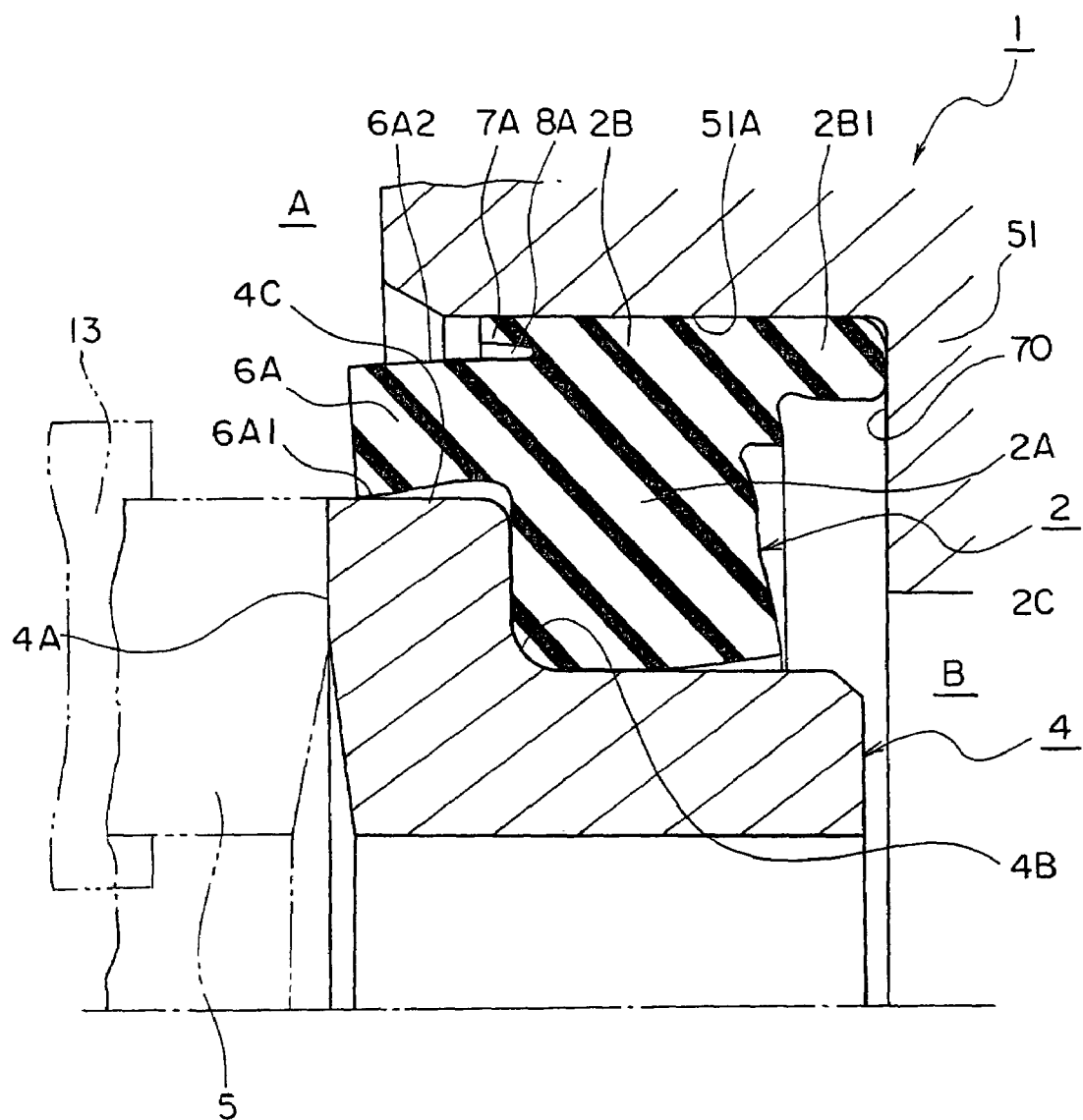
FIG. 3 is a partial section view of a seal device illustrating a second embodiment related to the present invention.
Figure 4:
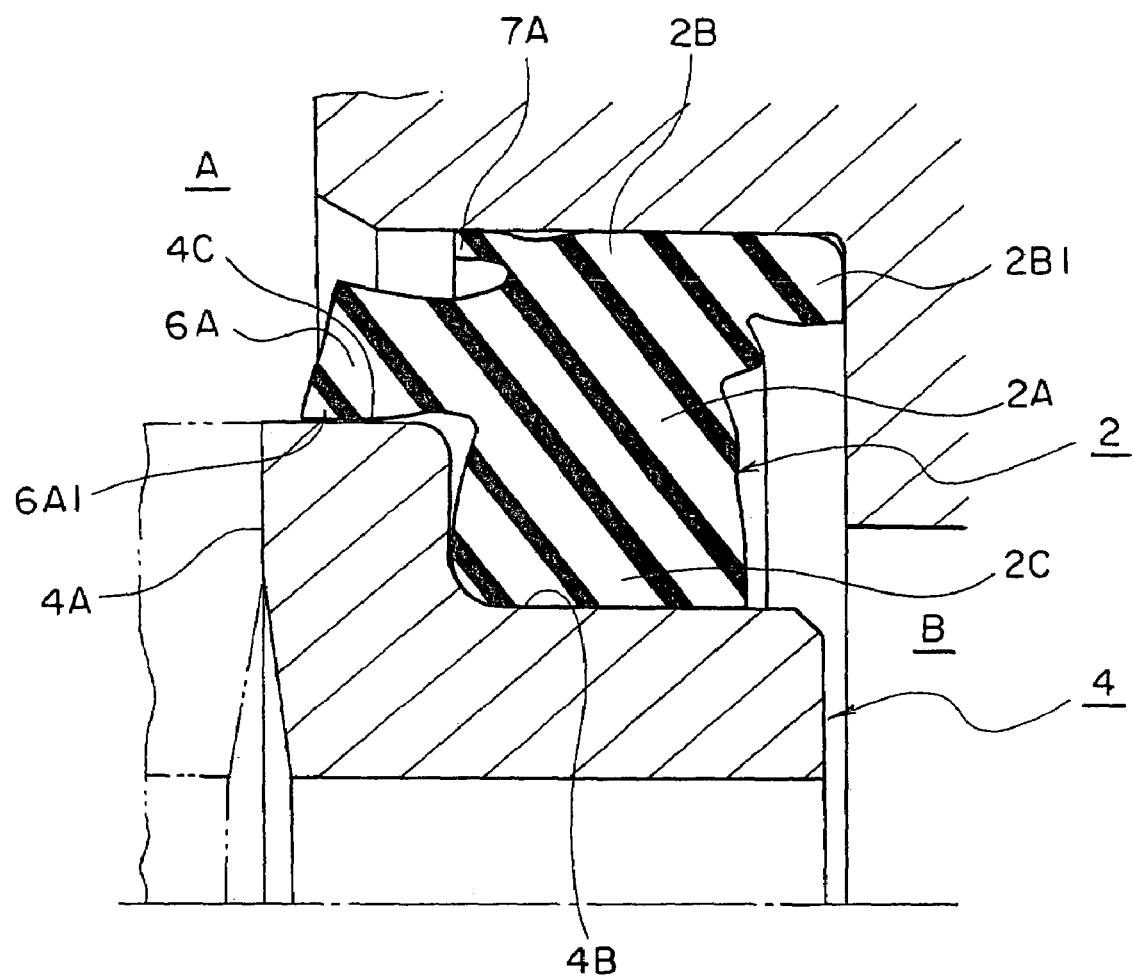
FIG. 4 is a partial section view of the seal device shown in FIG. 3 under the influence of fluid pressure.
Figure 5:
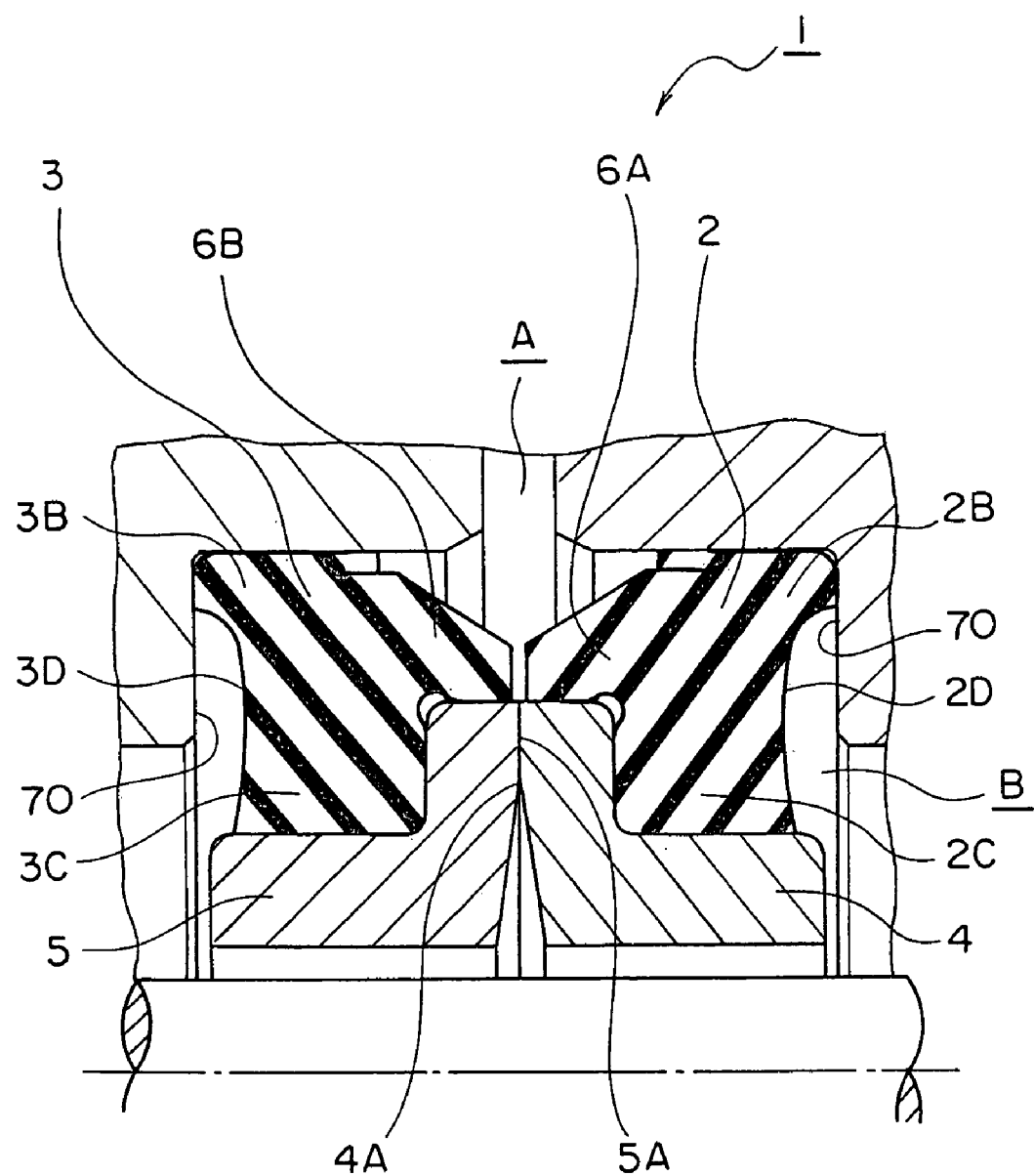
FIG. 5 is a half section view of a seal device illustrating a third embodiment related to the present invention.
Figure 6:
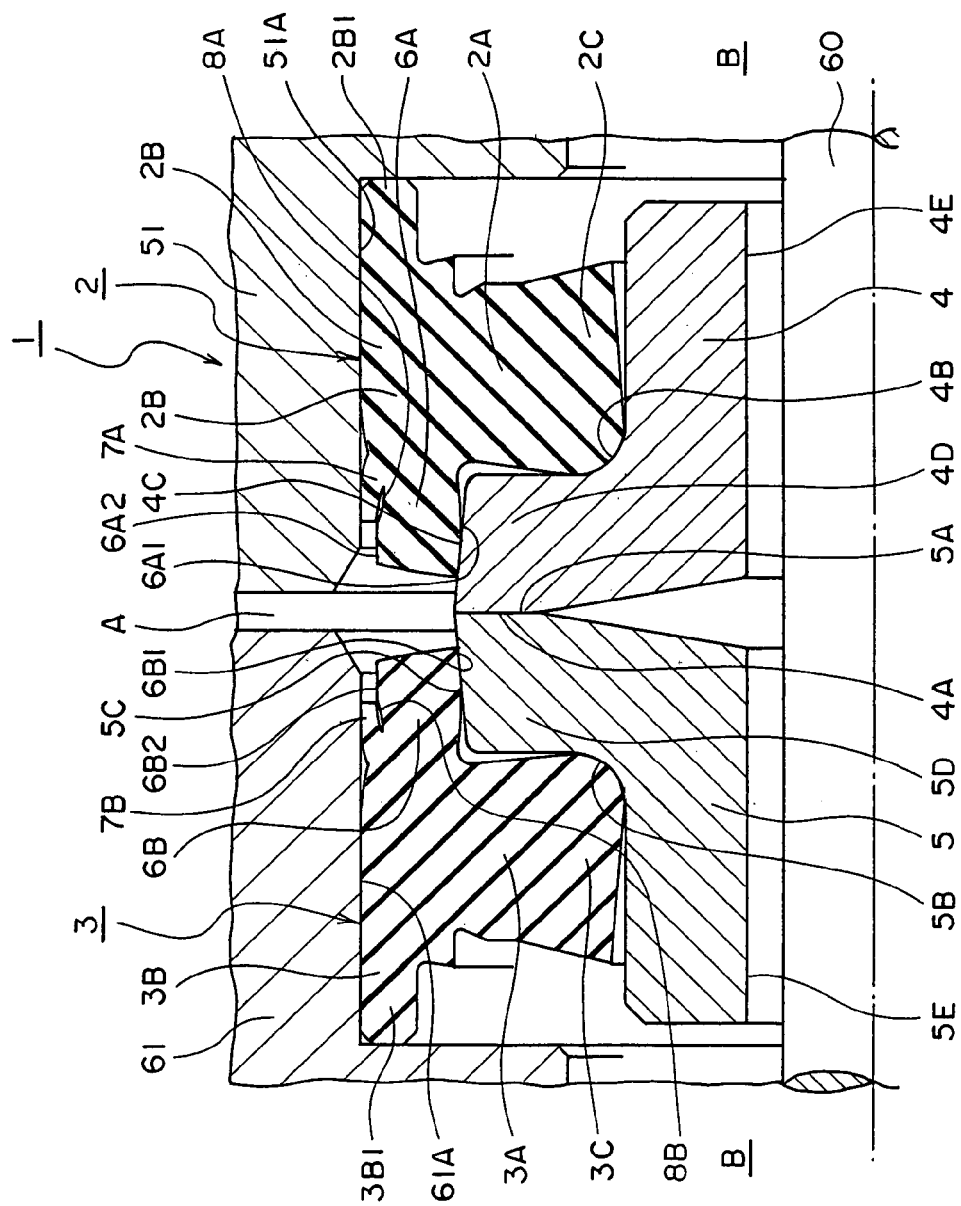
FIG. 6 is a half section view of a seal device illustrating a fourth embodiment related to the present invention.
Figure 7:
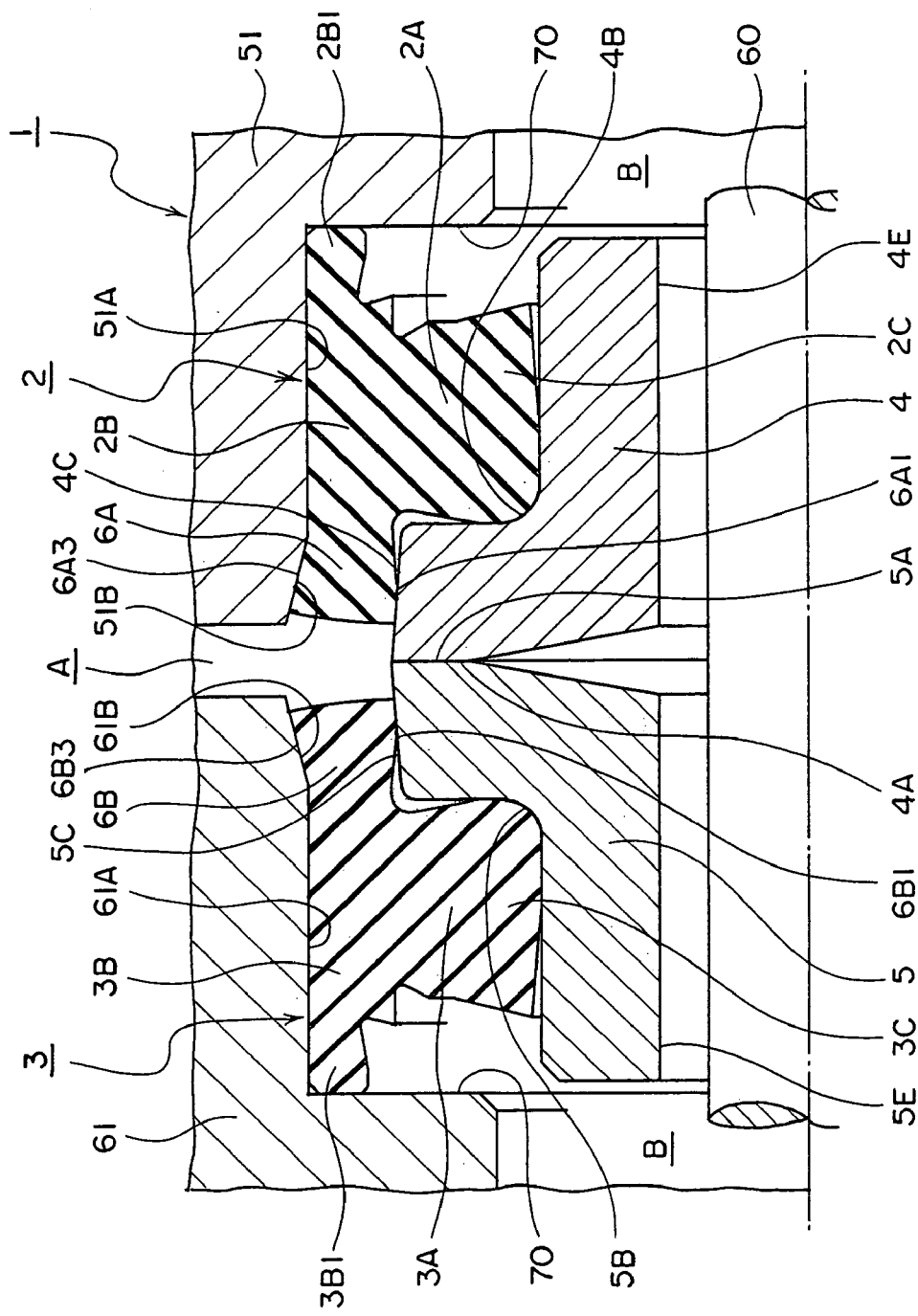
FIG. 7 is a half section view of a seal device illustrating a fifth embodiment related to the present invention.
Figure 8:
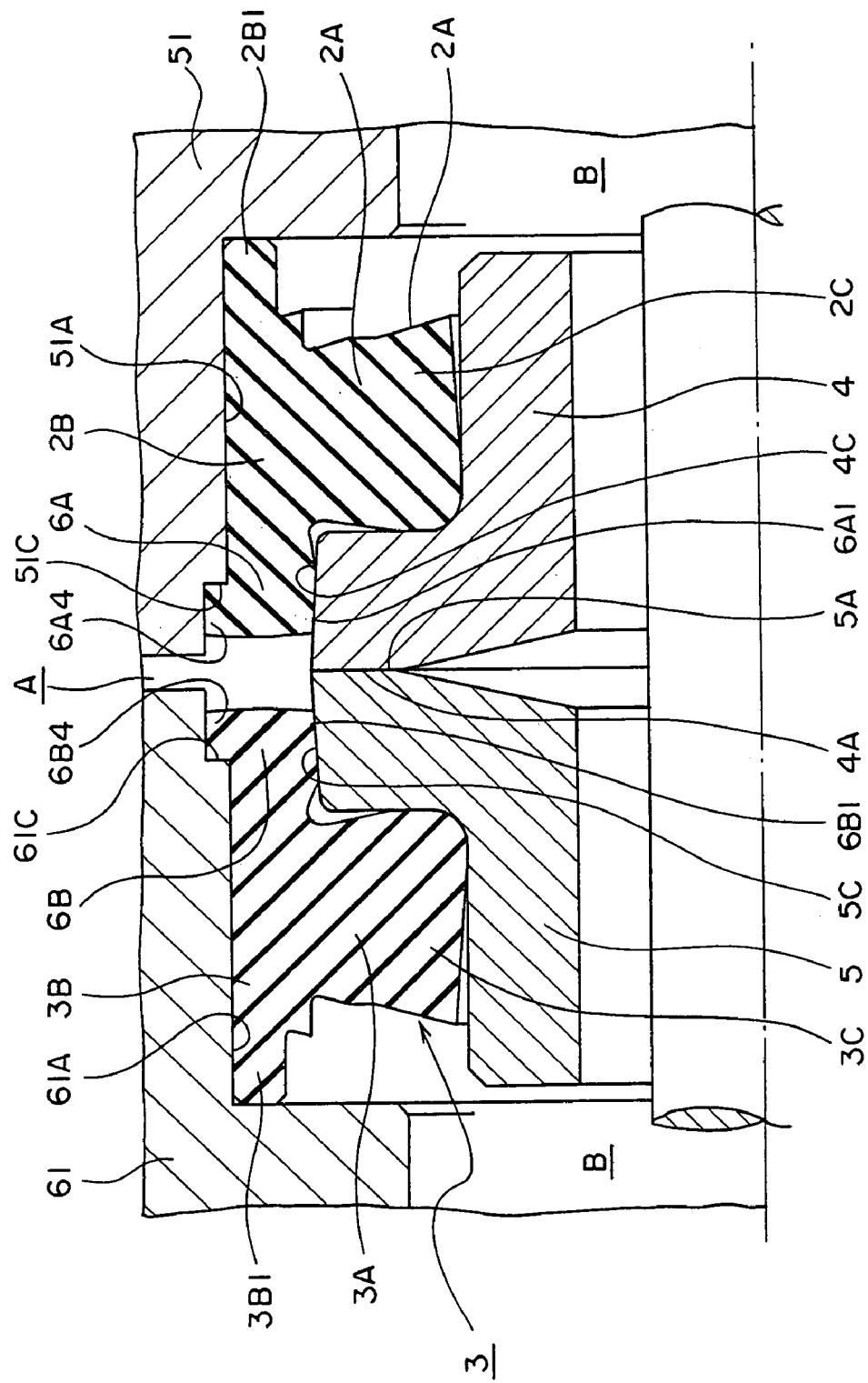
FIG. 8 is a half section view of a seal device illustrating a sixth embodiment related to the present invention.
Figure 9:
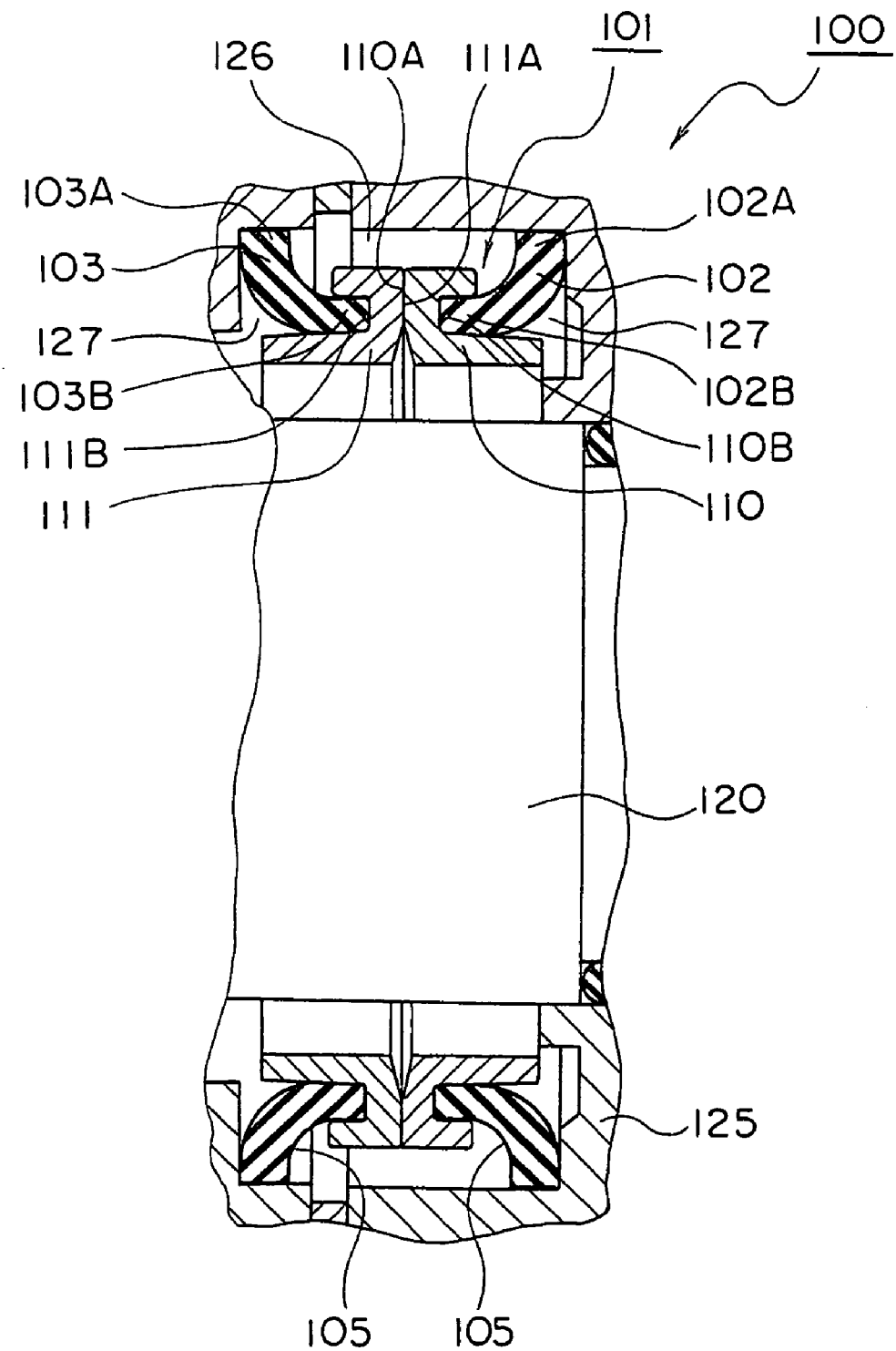
FIG. 9 is a cross-sectional view of a seal device as a prior art related to the present invention.

FIGS. 1 and 2 show a seal device 1 representing a first embodiment related to the present invention. FIG. 2 shows a reduction gear unit employing the seal device 1 of FIG. 1. Further, FIG. 3 shows a seal device 1 representing a second embodiment related to the present invention. FIG. 4 shows a state of the seal device 1 under an influence of fluid pressure. FIG. 5 shows a seal device 1 representing a third embodiment related to the present invention. FIG. 6 shows a seal device 1 representing a fourth embodiment related to the present invention. FIG. 7 shows a seal device 1 representing a fifth embodiment related to the present invention. Also FIG. 8 shows a seal device 1 representing a sixth embodiment related to the present invention.

In FIGS. 1 and 2, the seal device (floating seal) 1 is disposed within a seal chamber 70 which is formed between a roller 50 and a shaft 60. The seal chamber 70 is defined as an inner space surrounded by the shaft 60, a first fixing surface 51A of a bushing (annular portion) 51 which is mounted via an O-ring 20 at the end portion of the roller 50, and a retainer surface 61A of a cover (retaining portion) 61 which is attached to the shaft 60. It is possible to replace the bushing 51 by a resilient seal ring which is directly mounted to the roller 50. In this case, the roller 50 itself constitutes the annular portion 51. Choice of the annular portion 51 and the retaining portion 61 should not be restricted to the examples described here. Instead, they should be considered as one component and its mating component both of which mount a seal device and rotate relative to each other.

Seal device 1 disposed a first resilient seal ring 2 and a second resilient seal ring 3 therein. A first resilient body member 2A in an annular form constitutes a main body of the first resilient seal ring 2. The outer circumferential portion of the first resilient body member 2A is defined as a first outer circumferential seal portion 2B while the inner circumferential portion is defined as a first inner circumferential seal portion 2C. The first resilient body member 2A makes a small angle in a direction from a fixing surface 51A toward a first support portion 4B wherein the small angle causes a resilient, urging force which presses against a first seal ring 4 in the axial direction. The angle of the first resilient body member 2A is a design parameter which is a function of the urging force to the first seal ring 4 and the length of the first resilient body member 2A. The first outer circumferential seal portion 2B is formed so as to engage with the fixing surface 51A of "L"-shaped cross section. The first outer circumferential seal portion 2B also retains a protruding first base portion 2B1. The first inner circumferential seal portion 2C is formed so as to engage with the outer perimeter surface of a first support portion 4B which defines the "L"-shaped outer circumferential surface of the first seal ring 4.

The first resilient body member 2A also disposes a first seal lip member 6A which has a tapered diameter surface and protrudes forward against the sealed fluid (left direction in the figure). Outer diameter surface of the first seal lip member 6A defines a first action diameter surface 6A2 to which the sealed fluid acts on. The inner diameter surface of the front tip portion of the first seal lip member 6A defines a first seal contact surface 6A1 whose contact length with a first outer diameter seal contact surface 4C is less than 16 mm. The free end portion of the first seal lip member 6A has a larger wall thickness than its root portion located toward the first resilient body member 2A. The first seal contact surface 6A1 defines a tapered surface making an angle toward the root portion in the range of from 1 degree to 45 degrees. This configuration allows the first seal contact surface 6A1 to be brought into contact with the first outer diameter seal contact surface 4C at an optimal surface pressure and to exhibit an outstanding seal performance against the sealed fluid.

It has been shown that the first seal contact surface 6A1 is configured to form a seal-tight contact with the first outer diameter seal contact surface 4C of the first seal ring 4. In addition, the first outer circumferential seal portion 2B retains a first seal portion 7A which protrudes toward the same direction as the first seal lip member 6A and is brought into a seal contact with the fixing surface 51A. An annular groove formed between the first seal portion 7A and the first action diameter surface 6A2 defines a first pressure receiving groove 8A. The fluid pressure acted onto the first pressure receiving groove 8A effectively prevents the fluid from flowing into an internal chamber B because of the seal contact formed between the first seal portion 7A and the fixing surface 51A of the bushing 51. The first resilient seal ring 2 is made of a rubber material, thus elastic. Examples of the rubber material include perfluoro-elastomer, nitrile rubber (NBR) of hardness DuroA 60 to 80, urethane rubber (U), fluoro rubber (FKM), isobutylene-isoprene rubber (IIR), nitrile hydride rubber (H-NBR), elastic resin (for example, tetrafluoroethylene-perfluoromethylvinylether rubber) and so on.

A second resilient seal ring 3 is disposed in a symmetrical manner with respect to the first resilient seal ring 2. A second resilient body member 3A in an annular form constitutes a main body of the second resilient seal ring 3. The outer circumferential portion of the second resilient body member 3A is defined as a second outer circumferential seal portion 3B while the inner circumferential portion is defined as a second inner circumferential seal portion 3C. Furthermore, the second resilient body member 3A makes an angle in a direction from the second outer circumferential seal portion 3B toward the second inner circumferential seal portion 3C. Namely, the second resilient body member 3A makes a small angle in a direction from a retainer surface 61A toward a second support portion 5B wherein the small angle causes a resilient, urging force which presses against a second seal ring 5 in the axial direction. The angle of the second resilient body member 3A is a design parameter which is a function of the urging force to the second seal ring 5 and the length of the second resilient body member 3A. The second outer circumferential seal portion 3B is formed so as to engage with the retainer surface 61A of "L"-shaped cross section. The second outer circumferential seal portion 3B also retains a protruding second base portion 3B1. The second inner circumferential seal portion 3C is formed so as to engage with the outer perimeter surface of a second support portion 5B which defines the "L"-shaped outer circumferential surface of the second seal ring 5.

The second resilient body member 3A also disposes a second seal lip member 6B which has a tapered diameter surface and protrudes forward against the sealed fluid (right direction in the figure). Outer diameter surface of the second seal lip member 6B defines a second action diameter surface 6B2 to which the sealed fluid acts on. In addition, the second outer circumferential seal portion 3B retains a second seal portion 7B which protrudes toward the same direction as the second seal lip member 6B and is brought into a seal contact with the retainer surface 61A. An annular groove formed between the second seal portion 7B and the second action diameter surface 6B2 defines a second pressure receiving groove 8B. The fluid pressure acted onto the second pressure receiving groove 8B effectively prevents the fluid from flowing into the internal chamber B because of the seal contact formed between the second seal portion 7B and the retainer surface 61A of the cover 61. The second resilient seal ring 3 is made of a rubber material, thus elastic. Examples of the rubber material include perfluoro-elastomer, nitrile rubber (NBR) of hardness DuroA 60 to 80, urethane rubber (U), fluoro rubber (FKM), isobutylene-isoprene rubber (IIR), nitrile hydride rubber (H-NBR), elastic resin (for example, tetrafluoroethylene-perfluoromethylvinylether rubber) and so on.

A pair of the first seal ring 4 and the second seal ring 5 symmetrically arranged to each other are disposed in a symmetrical manner. The first seal ring 4 retains an annular body form whose cross section is "L"-shaped. A first seal face 4A is disposed on the side surface of a first flange portion 4D of the first seal ring 4. The optimal contact length of the first seal face 4A can be achieved by making the radially inner portion of the side surface a tapered surface or a step shoulder surface. The "L"-sectioned outer circumferential surface of the first seal ring 4 constitutes the first support portion 4B. The outer circumferential surface of the first flange portion 4D defining the first seal face 4A of the first seal ring 4 constitutes the first outer diameter seal contact surface 4C. A first inner diameter surface 4E of the first seal ring 4 forms a clearance fit relative to the shaft 60 with a gap therebetween.

The second seal ring 5, the other component constituting the pair, retains an annular body form whose cross section is "L"-shaped. The side surface of a second flange portion 5D of the second seal ring 5 defines a second seal face 5A which comes into seal contact with the first seal face 4A. The radially inner portion of the side surface of the second seal face 5A is arranged to form a tapered surface or a step shoulder surface to the axial direction. The "L"-sectioned outer circumferential surface of the second seal ring 5 constitutes the second support portion 5B. The outer circumferential surface of the second flange portion 5D defining the second seal face 5A of the second seal ring 5 constitutes the second outer diameter seal contact surface 5C. A second inner diameter surface 5E of the second seal ring 5 forms a clearance fit relative to the shaft 60 with a gap therebetween.

The first seal ring 4 and the second seal ring 5 are made of cast iron, heat treated steel, heat resistive metal alloy, SiC, super-hard alloy, alumina ceramics or the like. Or one of the first seal ring 4 and the second seal ring 5 can be made of carbon material for a small friction coefficient. The first seal ring 4 can be fixed with the bushing 51 via a drive pin, not shown, such that they rotate together. Likewise, the second seal ring 5 can be fixed with the cover 61 via another drive pin so that the second seal ring 5 is not dragged by the first seal ring 4. Furthermore, a resilient force may be reinforced for the first resilient body member 2A by immersing a leaf spring or coil spring therein.

In the first resilient seal ring 2 thus constructed, as seen in FIGS. 1 and 2, the first outer circumferential seal portion 2B fits the fixing surface 51A of the bushing 51 while the first inner circumferential seal portion 2C fits the first support portion 4B of the first seal ring 4. And the elastic force of the first resilient body member 2A urges the first seal surface 4A of the first seal ring 4 against the second seal surface 5A of the second seal ring 5. The first seal contact surface 6A1 of the first seal lip member 6A which is brought into seal contact with the first outer diameter seal contact surface 4C of the first flange portion 4D effectively prevents the sealed fluid from leaking through the fit surface between the first inner circumferential seal portion 2C and the first support portion 4B. This in turn prevents the first resilient body member 2A from lifting off the first support portion 4B and elastically deforming toward the internal chamber B.

The first resilient body member 2A is able to provide the first seal surface 4A of the first seal ring 4 with a sufficient, resilient force for maintaining a seal-tight contact relative to the second seal surface 5A. The first pressure receiving groove 8A acted on by the sealed fluid pressure intensifies the degree of seal contact in the first seal portion 7A of the first outer diameter contact seal portion 2B relative to fixing surface 51A, which further prevents the sealed fluid from leaking to the internal chamber B through the fit surface formed by the first outer diameter contact seal portion 2B and the fixing surface 51A. The fit surface of the first outer diameter contact seal portion 2B and the fixing surface 51A thus reinforced due to the first seal portion 7A avoids unwanted deformation of the first resilient body member 2A, and the elastic force of the first resilient body member 2A enhances the seal performance of the first seal surface 4A. In the second resilient seal ring 3, like the first resilient seal ring 2, the second outer circumferential seal portion 3B fits the retainer surface 61A while the second inner circumferential seal portion 3C fits the second support portion 5B of the second seal ring 5. And the elastic force of the second resilient body member 3A urges the second seal surface 5A of the second seal ring 5 against the first seal surface 4A of the first seal ring 4.

The second seal contact surface 6A1 of the second seal lip member 6B which is brought into seal contact with the second outer diameter seal contact surface 5C of the second flange portion 5D effectively prevents the sealed fluid from leaking through the fit surface between the second inner circumferential seal portion 3C and the second support portion 5B. This in turn prevents the second resilient body member 3A from lifting off the second support portion 5B and elastically deforming toward the internal chamber B. The second resilient body member 3A is able to provide the second seal surface 5A of the second seal ring 5 with a sufficient, resilient force for maintaining a seal-tight contact relative to the first seal surface 4A.

The seal device 1 illustrated in FIG. 2 is so constructed that the roller 50 rotates, thus the first seal ring 4 serving as a rotary seal ring. Therefore the second seal ring becomes a stationary seal ring. The arrangement of the rotary seal ring 4 and the stationary seal ring 5 can be swapped with each other depending on the type of machine the seal device is mounted on. It, however, is possible to effect a seal by employing a different form from the one indicated in FIG. 1 for either one of the first resilient seal ring 2 or the second resilient seal ring 3. For example, in case of the situation where few fine particles are contained in the sealed fluid, a rectangle-sectioned resilient seal ring can be used along the tilting angle for exerting a resilient, urging force against the seal ring.

The seal device 1 effects a seal against a sealed fluid such as dirt water or the like which is allowed to flow in through the ambient communication chamber A as the roller 50 rotates. In an adjacency of the internal chamber B, the roller 50 and the shaft 60 dispose bearings 25 therebetween and lubricants applied thereto. Even if the lubricants exert a pressure to the first resilient seal ring 2 and the second resilient seal ring 3, the support offered by the first reinforcement ring 22 and the second reinforcement ring 23, respectively, maintain elastic deformation of the rings without a drop of the seal capability. The lubricant pressure will rather lead to enhancing the seal capability as the result of more secure contact between the first seal surface 4A and the second seal surface 5A.

FIG. 3 shows a half sectional view of first resilient seal ring 2 and first seal ring 4 mated under an unloaded condition. It is noted that second resilient seal ring (packing) 13 is configured in a symmetrical manner to the first resilient seal ring 2. Its shape, however, is not restricted to be identical to that of the first resilient seal ring 2. For instance, the second seal ring 5 can approximately have a rectangular cross section. The three adjacent faces of the second seal ring 5 on its back face side are fittingly supported by the "U"-shape sectioned second resilient seal ring (packing) 13 which is fitted to the groove of the cover (retainer portion) 61. The second resilient seal ring 13 can be replaced by an O-ring (packing) mounted in an installation groove of the cover (retainer portion) 61. Under such a circumstance, the first resilient seal ring 2 exhibits a seal performance relative to this invention. This implies that the current invention can be embodied not only by combination of the first resilient seal ring 2 and the first seal ring 4 but also by substituting the first resilient seal ring 2 by the second resilient seal ring (packing) 13.

What the first resilient seal ring 2 (also second resilient seal ring 3) in FIG. 3 makes a difference from that in FIG. 1 is that the inner diameter surface of the front tip portion of the first seal lip member 6A defines a first seal contact surface 6A1 whose contact length with a first outer diameter seal contact surface 4C is in a range of from 1 mm to 12 mm. The free end portion of the first seal lip member 6A has a larger wall thickness than its root portion located toward the first resilient body member 2A. The first seal contact surface 6A1 defines a tapered surface making an angle toward the root portion in the range of from 1 degree to 45 degrees. This configuration allows the first seal contact surface 6A1 to be brought into contact with the first outer diameter seal contact surface 4C at an optimal surface pressure and to exhibit an outstanding seal performance against the sealed fluid. As a result, unwanted elastic deformation of the first resilient body member 2A is prevented and seal ability of the first seal face 4A and the second seal face 5A is enhanced. The first outer circumferential seal portion 2B also includes a first base portion 2B1 which protrudes in an opposite direction relative to the first seal lip member 6A. The first base portion 2B1 provides the first outer circumferential seal portion 2B with a resilient, urging force in the axial direction. Annular groove formed between the first action diameter surface 6A2 and the first seal portion 7A defines a first pressure receiving groove 8A.

FIG. 4 illustrates how the first resilient seal ring 2 in FIG. 3 deforms when loaded by fluid pressure of 0.6 MPa from the ambient communication chamber A. With the first resilient seal ring 2 in FIG. 3 as a comparison example 1 wherein a first seal lip member 6A is not employed in the resilient seal ring, it has been experimentally verified that application of 0.6 MPa fluid pressure to the resilient seal ring causes the surface pressure on the seal face to be reduced from 2.5 kN at an unloaded condition to one seventh of the surface pressure. On the other hand, with another example wherein the first seal lip member 6A is employed in the resilient seal ring 2, experiments under the same condition result in a surface pressure drop to only 1/2.3. These experimental results show that even if the first resilient seal ring 2 is acted on by fluid pressure through the ambient communication chamber A, an elastic deformation of the first resilient seal ring 2 toward the internal chamber B does not occur. This will lead to maintenance of the normal, resilient urging force between the first seal face 4A and the second seal face 5A, which in turn implies outstanding seal capability to be exhibited between the first seal face 4A and the second seal face 5A.

FIG. 5 shows a seal device 1 as a third embodiment related to the present invention. A difference between the seal device 1 in FIG. 5 and that in FIG. 1 is that the first seal lip member 6A of the former has a trapezoidal shape. Another difference is that the opposite end surface of the first resilient seal ring 2 relative to the first seal lip member 6A has an arcuate form. This configuration is intended to prevent elastic deformation of the resilient body member 2A caused by the fluid pressure through the ambient communication chamber A. Therefore, the elastic forces of the first resilient seal ring 2 and the second resilient seal ring 3 are strong enough to maintain outstanding seal ability at between the first seal face 4A of the first seal ring 4 and the second seal face 5A of the second seal ring 5 even under the presence of the fluid pressure being acted onto the first resilient seal ring 2 and the second resilient seal ring 3.

The first resilient seal ring 2 and the second resilient seal ring 3 shown in FIG. 5 are made of rubber material such as perfluoro-elastomer, nitrile rubber, nitrile hydride rubber (H-NBR), silicone rubber, fluoro rubber, acrylic rubber, styrene rubber, ethylene propylene rubber, urethane rubber or the like.

FIG. 6 shows a seal device 1 as a fourth embodiment related to the present invention. The seal device 1 of FIG. 6 is represented by the same reference numerals as the seal device 1 in FIG. 1 or 3 with the exception for the first resilient seal ring 2 and the second resilient seal ring 3. Thus, the detailed description of the first seal ring 4 and the second seal ring 5 is omitted. The first resilient seal ring 2 is configured more or less in the same form as the first resilient seal ring 2 in FIG. 3. There, however, are discrepancies with respect to first seal lip member 6A and first seal portion 7A. Wall thickness of the first seal lip member 6A is arranged thicker than the first seal lip member 6A of FIG. 3. And the first seal lip member 6A retains a first seal contact surface 6A1 and a first action diameter surface 6A2 on the inner circumferential surface and the outer circumferential surface, respectively.

The first seal contact surface 6A1 of the first seal lip member 6A defines a tapered surface making an angle toward the root portion in the range of from 1 degree to 45 degrees. This angle accommodates a desired axial force at the first seal contact surface 6A1 of the first seal lip member 6A in accordance with the radial contact force of the first seal contact surface 6A1 against the first outer diameter seal contact surface 4C where the axial force is reduced to 3 to 50% compared with the radial force. This provides an optimal surface pressure at the first seal contact surface 6A1 and effectively prevents the sealed fluid from leaking into the interface between the first seal contact surface 6A1 and the first outer diameter seal contact surface 4C. Axial length of the protruding portion of the first seal portion 7A is arranged smaller than that of the first seal lip member 6A. The length of the first seal portion 7A, if necessary, can be made as large as that of the first seal lip member 6A. When the first seal lip member 6A and the first seal portion 7A thus arranged are mounted onto between the first outer diameter seal contact surface 4C of the first seal ring 4 and the fixing surface 51A, the first pressure receiving groove 8A between the first seal lip member 6A and the first outer diameter seal contact surface 4C, which is firmly pressed therebetween, provides a sealing contact between the first seal contact surface 6A1 and the first outer diameter seal contact surface 4C as well as a sealing contact between the first seal portion 7A and the fixing surface 51A while the first pressure receiving groove 8A also allows the seal fluid to act thereto.

The second resilient seal ring 3 which has an identical form with the first resilient seal ring 2 is disposed in a symmetrical manner with respect to the first resilient seal ring 2. Namely, the wall thickness of the second seal lip member 6B, like the first seal lip member 6A, is arranged thicker. And the second seal lip member 6B retains a second seal contact surface 6B1 and a second action diameter surface 6B2 on the inner circumferential surface and the outer circumferential surface, respectively. The second seal contact surface 6B1 of the second seal lip member 6B defines a tapered surface making an angle toward the root portion in the range of from 1 degree to 45 degrees. This angle accommodates a desired axial force at the second seal contact surface 6B1 of the second seal lip member 6B in accordance with the radial contact force of the second seal contact surface 6B1 against the second outer diameter seal contact surface 5C where the axial force is reduced to 3 to 50% compared with the radial force. This provides an optimal surface pressure at the second seal contact surface 6B1 and effectively prevents the sealed fluid from leaking into the interface between the second seal contact surface 6B1 and the second outer diameter seal contact surface 5C.

Axial length of the protruding portion of the second seal portion 7B is arranged smaller than that of the second seal lip member 6B. A second pressure receiving groove 8B is disposed between the second seal portion 7B and second action diameter surface 6B2 and the fluid pressure is allowed to act on the second pressure receiving groove 8B. The length of the second seal portion 7B, if necessary, can be made as large as that of the second seal lip member 6B. When the second seal lip member 6B and the second seal portion 7B thus arranged are mounted onto between the second outer diameter seal contact surface 5C of the second seal ring 5 and the retainer surface 61A, the second pressure receiving groove 8B between the second seal lip member 6B and the second outer diameter seal contact surface 5C, which is firmly pressed therebetween, provides a sealing contact between the second seal contact surface 6B1 and the second outer diameter seal contact surface 5C as well as a sealing contact between the second seal portion 7B and the retainer surface 61A.

In the seal device thus configured, sands and mud contained in dirt water are accumulated in the ambient communication chamber A and increase the pressure within the chamber A. However, the first seal lip member 6A and the first seal portion 7A which are installed under a seal contact state between the first outer diameter seal contact surface 4C of the first seal ring 4 and the fixing surface 51A are capable of effecting a seal against the fluid pressure. The short axial length of the first seal portion 7A also contributes to intensifying the contact between the first seal contact surface 6A1 and the first outer diameter seal contact surface 4C since more significant fluid pressure acts on the first action diameter surface 6A2 of the first seal lip member 6A. Therefore, an increase of the fluid pressure leads to an increase of the contact force of the first seal contact surface 6A1 against the first outer diameter seal contact surface 4C and also prevents the fluid from entering between the first seal contact surface 6A1 against the first outer diameter seal contact surface 4C. The above argument applies to the second resilient seal ring 3 as well since the second resilient seal ring 3 plays the same role as the first resilient seal ring 2.

FIG. 7 shows a seal device 1 as a fifth embodiment related to the present invention. The seal device 1 of FIG. 7 is represented by the same reference numerals as the seal device 1 in FIG. 1 or 3 with the exception for the first resilient seal ring 2 and the second resilient seal ring 3. Thus, the detailed description of the first seal ring 4 and the second seal ring 5 previously stated is omitted. The first resilient seal ring 2 is configured more or less in the same manner as that in FIG. 3. Discrepancies are seen in the first seal lip member 6A and the first seal portion 7A. That is, the first seal lip member 6A is arranged thick in its wall thickness and there is no first seal portion 7A. A first contact surface 6A3 located in the outer circumference of the first seal lip member 6A is made thicker as it approaches the free end portion of the first seal lip member 6A while it forms a tapered surface which is made thinner toward the first resilient body member 2A. The taper angle is preferably in the range of from 3 degrees to 85 degrees. Thus, it defines a wedge form wherein the free end portion of the first seal lip member 6A is made thicker. Another tapered surface on the fixing surface 51A, a first fixing surface 51B, is defined toward the ambient communication chamber A side. The taper angle of the first fixing surface 5 is also preferably in the range of from 3 degrees to 85 degrees. When the fluid pressure acts on the first seal lip member 6A from the ambient communication chamber A side, the first seal lip member 6A generates a wedge-form contact against the first outer diameter seal contact surface 4C and the first fixing surface 51B and as a consequence seal capability at the first seal contact surface 6A1 and the first contact surface 6A3 is intensified. Therefore, even a high pressure fluid containing sands and mud can be effectively sealed by means of the first seal lip member 6A.

The second resilient seal ring 3 which has an identical form with the first resilient seal ring 2 is disposed in a symmetrical manner with respect to the first resilient seal ring 2. That is, the second seal lip member 6B of the second resilient seal ring 3 is configured to a wedge shape in such a way that it becomes thicker toward its free end portion and thinner toward the resilient body member 3A side. The second seal lip member 6B retains a second seal contact surface 6B1 and a second contact surface 6B3 on the inner circumferential surface and the outer circumferential surface, respectively wherein the second contact surface 6B3 is a tapered surface. The taper angle is preferably in the range of from 3 degrees to 85 degrees. A second fixing surface 61B which is brought into contact with the second contact surface 6B3 should also form a similar tapered surface. The angle also is preferably in the range of from 3 degrees to 85 degrees. When the fluid pressure acts on the second seal lip member 6B from the ambient communication chamber A side, the second seal lip member 6B generates a wedge-form contact against the second outer diameter seal contact surface 5C and the second fixing surface 61B and as a consequence seal capability at the second seal contact surface 6B1 and the second contact surface 6B3 is intensified. Therefore, even high pressure fluid containing sands and mud can be effectively sealed by means of the second seal lip member 6B. The second resilient seal ring 3 works similarly in other aspects to the first resilient seal ring 2.

FIG. 8 shows a seal device 1 as a sixth embodiment related to the present invention. The seal device 1 of FIG. 8 is represented by the same reference numerals as the seal device 1 in FIGS. 1 or 3 with the exception for the first resilient seal ring 2 and the second resilient seal ring 3. Thus, the detailed description of the first seal ring 4 and the second seal ring 5 previously stated is omitted. The first resilient seal ring 2 is configured more or less in the same manner as that in FIG. 3. Discrepancies are seen in the first seal lip member 6A and the first seal portion 7A. There is no first seal portion 7A in FIG. 8 and the outer circumferential portion of the free end portion of the first seal lip member 6A forms a thick step shoulder which defines a first seal portion 6A4. A portion of the fixing surface 51A toward the ambient communication chamber A side which is brought into contact with the first seal portion 6A4 also forms a step shoulder which defines a first engagement surface 51C.

High pressure fluid acting from the ambient communication chamber A side is effectively sealed by the first seal portion 6A4 which engages with the first engagement surface 51C. At the same time, the free end surface of the first seal lip member 6A being acted on by the high pressure fluid causes the first seal contact surface 6A1 to be brought into seal contact with the first outer diameter seal contact surface 4C, which effectively prevents the sealed fluid from leaking through between the first seal contact surface 6A1 and the first outer diameter seal contact surface 4C. Therefore, leakage of the sealed fluid from the ambient communication chamber A side to the internal chamber B can be avoided.

The second resilient seal ring 3 which has an identical form with the first resilient seal ring 2 is disposed in a symmetrical manner with respect to the first resilient seal ring 2. The outer circumferential portion of the free end portion of the second seal lip member 6B forms a thick step shoulder which defines a second seal portion 6B4. A portion of the retainer surface 61A toward the ambient communication chamber A side which is brought into contact with the second seal portion 6B4 also forms a step shoulder which defines a second engagement surface 61C.

High pressure fluid acting from the ambient communication chamber A side is effectively sealed by the second seal portion 6B4 which engages with the second engagement surface 61C. At the same time, the free end surface of the second seal lip member 6B being acted on by the high pressure fluid causes the second seal contact surface 6B1 to be brought into seal contact with the second outer diameter seal contact surface 5C, which effectively prevents the sealed fluid from leaking through between the second seal contact surface 6B1 and the second outer diameter seal contact surface 5C. Therefore, leakage of the sealed fluid from the ambient communication chamber A side to the internal chamber B can be avoided.

The first resilient seal ring 2 and the second resilient seal ring 3 seen in the fourth embodiment through the sixth embodiment are made of rubber material or rubber-like synthetic resin material. Typical material includes perfluoroelastomer, nitrile rubber, nitrile hydride rubber, silicone rubber, fluoro rubber, acrylic rubber, styrene rubber, ethylene propylene rubber, urethane rubber, rubber-like elastic resin (for example, tetrafluoroethylene-perfluoromethylvinylether rubber) and so on. The first resilient seal ring 2 and the second resilient seal ring 3 employed in the fourth embodiment through the sixth embodiment are arranged more or less in an identical form and disposed in symmetrical locations. However, either one of the first resilient seal ring 2 or the second resilient seal ring 3 can be configured as a resilient seal ring 13 as shown in FIG. 3 so that it exerts a resilient, urging force against a seal ring. Therefore, the resilient seal ring 13 may have a different form depending on the properties of the sealed fluid with which the seal device 1 has to deal.

Described next is alternative inventions of preferred examples related to the present invention.

Seal device of the second invention related to the present invention is a seal device 1 to effect a seal between a shaft 60 disposing a retainer 61 and a ring member 51 being disposed adjacent the shaft 60 and rotating relative to the shaft 60. The seal device 1 comprises a first seal ring 4, a first resilient body member 2A, a first seal lip member 6A, a second seal ring 5, a second resilient body member 3A and a second seal lip member 6B, wherein the first seal ring 4 is inserted to the shaft 60 and retains a first seal surface 4A, a first support portion 4B and a first outer diameter seal contact surface 4C, the first support portion 4B being located in an opposite side of the first seal surface 4A, the first outer diameter seal contact surface 4C defining an outer circumferential surface between the first seal surface 4A and the first support portion 4B, wherein the first resilient body member 2A is made of rubber-like elastic material and retains a first inner circumferential seal portion 2C at its one end and a first outer circumferential seal portion 2B at the other end and provides the first seal ring 4 with an urging force, the first inner circumferential seal portion 2C being engaged with the first support portion 4B of the first seal ring 4, the first outer circumferential seal portion 2B being engaged with the ring member 51, wherein the first seal lip member 6A protrudes from the first resilient body member 2A in an integral manner and is matingly brought into seal contact with the first outer diameter seal contact surface 4C, wherein the second seal ring 5 is inserted to the shaft 60 and retains a second seal surface 5A, a second support portion 5B and a second outer diameter seal contact surface 5C, the second support portion 5B being located in an opposite side of the second seal surface 5A, the second outer diameter seal contact surface 5C defining an outer circumferential surface between the first seal surface 4A and the second support portion 5B, wherein the second resilient body member 3A is made of rubber-like elastic material and retains a second inner circumferential seal portion 3C at its one end and a second outer circumferential seal portion 3B at the other end and provides the second seal ring 5 with an urging force, the second inner circumferential seal portion 3C being engaged with the second support portion 5B of the second seal ring 5, the second outer circumferential seal portion 3B being engaged with the retainer portion 61, wherein the second seal lip member 6B protrudes from the second resilient body member 3A in an integral manner and is matingly brought into seal contact with the second outer diameter seal contact surface 5C.

According to the seal device 1 related to the second invention, since the first seal lip member 6A and the second seal lip member 6B are brought into seal contact with the first outer diameter seal contact surface 4C and the second outer diameter seal contact surface 5C, respectively, the sealed fluid pressure exerted from the ambient communication chamber side acts on the first and second action circumferential surfaces 6A2, 6B2 of the first and second seal lip members 6A, 6B, respectively. This intensifies the contact of the first and second seal lip members 6A, 6B against the corresponding first and second outer diameter circumferential seal contact surfaces 4C, 5C, and effectively prevents the sealed fluid from leaking into the interfaces between the first support portion 4B and the first inner circumferential seal portion 2B and between the second support portion 5B and the second inner circumferential seal portion 3C. The first seal ring 4 and the second seal ring 5 are resiliently urged against each other by means of the first resilient seal ring 2 and the second resilient seal ring 3, respectively, and the first seal surface 4A of the first seal ring 4 and the second seal surface 5A of the second seal ring 5 are capable of exhibiting outstanding seal performance thereat with neither a relative displacement in a radial direction nor a relative angular offset between the two surfaces in a direction the two surfaces fall apart. Both the first and second seal surfaces 4A, 5A can maintain a secure seal contact even when dirt water accumulated in the ambient communication chamber causes an increase in the internal pressure.

Seal device of the third invention related to the present invention includes a first contact surface 6A3, a second contact surface 6B3, a first fixing surface 51B and a second fixing surface 61B, wherein the first contact surface 6A3 is defined on the outer circumferential surface of the free end portion of the first seal lip member 6A which forms a tapered surface toward the free end, wherein the second contact surface 6B3 is defined on the outer circumferential surface of the free end portion of the second seal lip member 6B which forms a tapered surface toward the free end, wherein the first contact surface 6A3 is brought into compressive contact with a tapered first fixing surface 51B which is disposed on the ring member 51, wherein the second contact surface 6B3 is brought into compressive contact with a tapered second retainer surface 61B which is disposed on the second retainer portion 61.

According to the seal device related to the third invention, the tapered first contact surface 6A3 disposed on the outer circumferential surface of the first seal lip member 6A is brought into compressive contact with the tapered first fixing surface 51B. Likewise, the tapered second contact surface 6B3 disposed on the outer circumferential surface of the second seal lip member 6B is brought into compressive contact with the tapered second fixing surface 61B. Therefore, the fluid pressure acted on to the free end surfaces of the first seal lip member 6A and the second seal lip member 6B induces wedge-forming contact between the first contact surface 6A3 and the first fixing surface 51B. Similarly, the fluid pressure induces wedge-forming contact between the second contact surface 6B3 and the second fixing surface 61B. The first seal contact surface 6A1 is brought into secure contact with the first outer diameter seal contact surface 4C by an adequate surface pressure in accordance with the wedge-forming force. In a similar manner to the first seal lip member 6A, the second seal lip member 6B is brought into secure contact with the second outer diameter seal contact surface 5C.

Seal device of the fourth invention related to the present invention includes a first seal portion 6A4 and a second seal portion 6B4, wherein the first seal portion 6A4 is a step shoulder which is formed by thickening the outer circumferential surface of the free end portion of the first seal lip member 6A, wherein the second seal portion 6B4 is also a step shoulder which is formed by thickening the outer circumferential surface of the free end portion of the second seal lip member 6B, wherein the first seal portion 6A4 is compressively engaged with the first engagement surface 51C which is a step shoulder disposed in the ring member 51 while the second seal portion 6B4 is compressively engaged with the second engagement surface 61C which is a step shoulder disposed in the retainer portion 61.

According to the seal device related to the fourth invention, the first seal portion 6A4, a step shoulder, disposed on the outer circumferential surface of the first seal lip member 6A is brought into compressive contact with the first engagement surface 51C which also forms a step shoulder. The second seal portion 6B4, another step shoulder, is brought into compressive contact with the second engagement surface 61C which also forms a step shoulder. Therefore, when a fluid pressure is applied to the free end surfaces of the first seal lip member 6A and the second seal lip member 6B, the first seal portion 6A4 of the first seal lip member 6A is engaged with the first engagement surface 51C at the step shoulder. The first seal portion 6A4 and the first engagement surface 51C act at the step shoulder in such a way that the first seal contact surface 6A1 is brought into compressive contact with the first outer diameter seal contact surface 4C in a direction from the free end portion to the root portion of the first seal lip member 6A. This enables the first seal contact surface 6A1 to exhibit outstanding seal ability by coming into contact with the first outer diameter seal contact surface 4C at an adequate pressure in accordance with the fluid pressure. The second seal lip member 6B similarly operates for the outstanding seal performance of the second seal contact surface 6B1.

Seal device of the fifth invention related to the present invention includes a first seal portion 7A, a second seal portion 7B, a first pressure receiving groove 8A and a second pressure receiving groove 8B, wherein the first seal portion 7A is integral with the first resilient body member, extends in the same direction as the first seal lip member 6A and is brought into seal contact with the ring member 51, wherein the second seal portion 7B is integral with the second resilient body member, extends in the same direction as the second seal lip member 6B and is brought into seal contact with the retainer portion 61, wherein the first pressure receiving groove 8A is disposed between the first seal lip member 6A and the first seal portion 7A, wherein the second pressure receiving groove 8B is disposed between the second seal lip member 6B and the second seal portion 7B.

According to the seal device related to the fifth invention, since the first pressure receiving groove 8A is disposed between the first seal lip member 6A and the first seal portion 7A, a fluid pressure acted onto the first pressure receiving groove 8A operates the first seal contact surface 6A1 to be brought into compressive contact with the first outer diameter seal contact surface 4C. Likewise, the fluid pressure in the pocket of the first pressure receiving groove 8A operates the first seal portion 7A to be brought into compressive contact with the fixing surface 51A. This configuration can assure seal ability against sealed fluid of dirt water or high pressure. Similar effects can be obtained for the second seal lip member 6B as well. Therefore, even when the sealed fluid contains dirt, the seal device can exhibit effective seal performance between the first seal surface 4A of the first seal ring 4 which is sealingly retained by the first resilient body member 2A and the second seal surface 5A of the second seal ring 5 which is sealingly retained by the second resilient body member 3A.

Seal device of the sixth invention related to the present invention is configured in such a way that the first seal lip member 6A and the first seal portion 7A are compressively loaded between the first outer diameter seal contact surface 4C and the ring member 51 by bringing the two faces of the first pressure receiving groove 8A into contact with each other and the second seal lip member 6B and the second seal portion 7B are compressively loaded between the second outer diameter seal contact surface 5C and the retainer portion 61 by bringing the two faces of the second pressure receiving groove 8B into contact with each other.

According to the seal device related to the sixth invention, the first seal lip member 6A and the first seal portion 7A retain the first pressure receiving groove 8A therebetween and the two faces of the first pressure receiving groove 8A are brought into contact with each other. When a fluid pressure is moderate, the fluid pressure acts on the first action diameter surface 6A2 located on the outer circumferential surface of the first seal lip member 6A in order to bring the first seal contact surface 6A1 into seal contact with the first outer diameter seal contact surface 4C. When the fluid pressure becomes high enough to open up the first pressure receiving groove 8A, the fluid pressure guided to within the first pressure receiving groove 8A operates so as to bring the first seal contact surface 6A1 of the first seal lip member 6A into compressive contact with the first outer diameter seal contact surface 4C. Likewise, the first seal portion 7A is also brought into compressive contact with the fixing surface 51A. This configuration allows the sealed fluid, dirt water or high pressure fluid, to operate to open up the first pressure receiving groove 8A for effecting seal. The second seal lip member 6B operates in a similar manner for the same effect. Thus, a seal fluid such as dirt water can effectively be sealed.

As described so far a seal device related to the present invention is advantageous for effecting seal in crawler roller, reduction gear, hydraulic motor, track roller or the like. More particularly, the seal device is capable of effecting a seal against sealed fluid under harsh conditions such as crawler roller, hydraulic motor of construction machinery or the like.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A seal device for effecting a seal between a shaft disposing a retainer portion and a ring member being inserted over said shaft and being rotatable relative to said shaft, said seal device comprising:
  (a) a second seal ring having a second seal surface and being brought into seal contact with a packing and being inserted over said shaft, said packing being mounted to one member of said retainer portion or said ring member;
  (b) a first seal ring having a first seal surface, a first support portion and a first outer diameter seal contact surface, said first seal ring being inserted over said shaft, said first seal surface facing against said second seal surface, said first support portion being disposed at a side opposite to said first seal surface, said first outer diameter seal contact surface being disposed on the outer circumferential surface between said first support portion and said first seal surface;

(c) a first resilient body member having a first inner circumferential seal portion at one end and a first outer circumferential seal portion at the other end, said first resilient body member applying an urging force to said first seal ring and being formed from an elastic material, said first inner circumferential seal portion matingly engaging said first support portion of said first seal ring, said first outer circumferential seal portion matingly engaging the other member of said retainer portion or said ring member;

(d) a first seal lip member protruding from said first resilient body member and having a seal contact surface sealingly contacting said first outer diameter seal contact surface of said first seal ring at an inner circumferential surface of the first seal lip member, said first seal lip member also having an action diameter surface located on an outer circumferential surface of said first seal lip member, wherein a wall thickness of a free end portion of said first seal lip member is larger than a wall thickness of a root portion of said first seal lip member, and wherein the root portion is located toward a first resilient body member side of said first seal lip member;

(e) a first seal portion protruding from said first resilient body member in a common direction as said first seal lip member protrudes, said first seal portion having a length that is shorter than a length of said first seal lip member and a thickness that is thinner than a thickness of said first lip seal member, wherein a gap is defined between said action diameter surface of said first seal lip member and the other member of said retainer portion or said ring member, said first seal portion contacting the other member of said retainer portion or said ring member; and (f) a first pressure receiving groove defined between said first seal lip member and said first seal portion, said first pressure receiving groove being in communication with said gap.

2. The seal device as claimed in claim 1, wherein said second seal ring has a shape symmetric relative to said first seal ring and includes a second seal surface, a second support portion and a second outer diameter seal contact surface, said second seal surface being brought into seal contact with said first seal surface, said second support portion being disposed at the opposite side to said second seal surface, said second outer diameter seal contact surface being disposed on the outer circumference surface between said second support portion and said second seal surface, wherein said packing includes a second resilient body member, a second inner circumferential seal portion and a second outer circumferential seal portion, said second inner circumferential seal portion being located at one end of said second resilient body member and mating with said second support portion of said second seal ring, said second outer circumferential seal portion being located at the other end of said second resilient body member and mating with said retainer portion, and further comprising:

a second seal lip member protruding from said second resilient body member and having a seal contact sealingly contacting said second outer diameter seal contact surface of said second seal ring at an inner circumferential surface of the second seal lip member, said second seal lip member also having an action diameter surface located on an outer circumferential surface of the second seal lip member, wherein a wall thickness of a free end portion of said second seal lip member is larger than a wall thickness of a root portion of said second seal lip member, and wherein the root portion is located toward a second resilient body member side of said second seal lip member;

a second seal portion protruding from said second resilient body member in a common direction as said second seal lip member protrudes, said second seal portion having a length shorter than a length of said second seal lip member and a thickness that is thinner than a thickness of said second lip seal member, wherein a second gap is defined between said action diameter surface of said second seal lip member and the one member of said retainer portion or said ring member, said second seal portion contacting the other member of said retainer portion or said ring member; and a second pressure receiving groove defined between said first seal lip member and said first seal portion, said second pressure receiving groove being in communication with said second gap.

* * * * *